United States Patent [19]

Kobayashi et al.

[11] Patent Number: 5,184,228
[45] Date of Patent: Feb. 2, 1993

[54] RECORDING CIRCUIT FOR MIRROR MOTHER TAPE

[75] Inventors: Toshiharu Kobayashi; Keisuke Unno, both of Tokyo, Japan

[73] Assignee: Sony Corporation, Tokyo, Japan

[21] Appl. No.: 722,170

[22] Filed: Jun. 27, 1991

[30] Foreign Application Priority Data

Jul. 5, 1990 [JP] Japan .................................. 2-178232

[51] Int. Cl.[5] .......................... H04N 9/79; H04N 9/83
[52] U.S. Cl. ...................................... 358/310; 358/36;
358/335; 358/330; 358/336; 358/378; 360/17;
360/15
[58] Field of Search .............. 358/310, 335, 330, 336,
358/340, 36, 167, 328, 314, 37, 31, 166; 360/15,
17, 33.1, 38.1

[56] References Cited

U.S. PATENT DOCUMENTS 4,812,920 3/1989 Nagashima et al. ................ 358/330
4,908,581 3/1990 Honjo .................................... 358/36

Primary Examiner—Tommy P. Chin
Assistant Examiner—Khoi Truong
Attorney, Agent, or Firm—Alvin Sinderbrand; William S. Frommer

[57] ABSTRACT

In a recording apparatus for a mirror mother tape to be used in a contact-type magnetic printing process, a chrominance signal of an incoming color video signal is converted into a down converted chrominance signal having a reduced frequency fC, a beat cancelling signal having a frequency 2fC is generated from the down converted chrominance signal, the beat cancelling signal is added to a luminance signal of the incoming color video signal thereby generating an added signal, and the down converted chrominance signal is combined with the added signal to provide a composite signal which is recorded on a mirror mother tape.

4 Claims, 3 Drawing Sheets

RECORDING CIRCUIT FOR MIRROR MOTHER TAPE

BACKGROUND OF THE INVENTION

1. Field of the Invention

The present invention generally relates to a recording apparatus for a mirror mother tape, and more particularly to a recording apparatus which is suitable for preparing a mirror mother tape for use in a contact type magnetic transfer printing apparatus in which a color video signal recorded on the mirror mother tape is copied onto copy tape.

2. Description of the Prior Art

In a contact type magnetic transfer apparatus, a mirror mother tape and a copy tape are contacted to each other, and a color video signal previously recorded on the mother tape is transferred to the copy tape by applying a magnetic field from a transfer bias head.

The mother tape is prepared using a recording circuit of a video tape recorder (VTR) for a mirror mother tape in a manner briefly described below. First, a luminance signal and a chrominance signal are separated from a color video signal to be recorded on the mirror mother tape. Then, the separated luminance signal is converted into a frequency-modulated signal by FM-modulation, while the separated chrominance signal is down converted into a down converted chrominance signal having a reduced frequency. Finally, these converted luminance and chrominance signals are combined or mixed and then applied to a magnetic head, so the composite signal, that is, the color video signal, can be recorded on the mirror mother tape in opposite polarity by the magnetic head, thereby preparing a so-called mirror mother tape.

A copy tape is produced by printing the color video signal thereon from the mirror mother tape using a contact type magnetic printing apparatus. The color video signal printed on the prepared copy tape is subjected to frequency demodulation and frequency conversion by a tape reproducing apparatus to be restored into the original color video signal and then an image of the converted color video signal is reproduced on a monitor, for example.

However, when an original video signal is reproduced by a tape reproducing apparatus from a copy tape which has been copied from a mirror mother tape prepared using a recording circuit of a conventional recording apparatus as described above, an unnecessary component, having a frequency $fy \pm 2 \times fC$, of the frequency converted chrominance signal is generated, where fy represents a frequency of the luminance signal and fC a frequency of the down-converted chrominance signal. The consequent problem is that a noise component having a mesh-like configuration appears in the image displayed on the monitor due to the secondary beat component, that is, the unnecessary frequency component having a frequency $fy \pm 2 \times fC$.

Further, it is difficult to record a down converted chrominance signal on a metal tape of relatively thin thickness, so that it is desirable to employ a large recording current for the down converted chrominance signal when recording it on a mother tape. In this case, however, the secondary beat component having a frequency $fy \pm 2 \times fC$ becomes larger, and so it has been impossible to increase the level of the recording current.

OBJECTS AND SUMMARY OF THE INVENTION

Accordingly, it is a general object of the present invention to provide an improved apparatus for recording on a mirror mother tape in which the aforementioned shortcomings and disadvantages of the prior art can be eliminated.

More specifically, it is an object of the present invention to provide an improved recording apparatus which is capable of preparing a mirror mother tape such that a distortion due to the secondary beat component, having a frequency $fy \pm 2 \times fc$, of the down converted chrominance signal can be eliminated when reproducing the copy tape to which a color video signal is transferred from the mirror mother tape.

It is another object of the present invention to provide an improved recording apparatus for a mirror mother tape in which a recording current for recording the down-converted chrominance signal on the mirror mother tape can be made large, to thereby improve a signal to noise ratio of the chrominance signal recorded on the mother tape.

According to an aspect of the present invention, there is an apparatus for recording on a mirror mother tape to be used in a contact printing process, an incoming color video signal including a chrominance signal and a luminance signal, said apparatus comprising: means for down converting the chrominance signal into a down-converted chrominance signal having a reduced carrier frequency fc, means for generating, from the down-converted chrominance signal, a beat cancelling signal having a frequency of 2fC, means for adding the beat cancelling signal to the luminance signal so as to generate an added signal, means for combining the down-converted chrominance signal with the added signal so as to provide a combined signal, and means for recording the combined signal on the mirror mother tape.

The above and other objects, features, and advantages of the present invention will become apparent from the following detailed description of an illustrative embodiment to be read in conjunction with the accompanying drawings, in which like reference numerals represent the same or similar elements.

DETAILED DESCRIPTION OF THE PREFERRED EMBODIMENT

A preferred embodiment of a recording circuit of a mirror mother video tape recorder (VTR) according to the present invention will now be described by way of example and with reference to the accompanying drawings.

Figure 1:
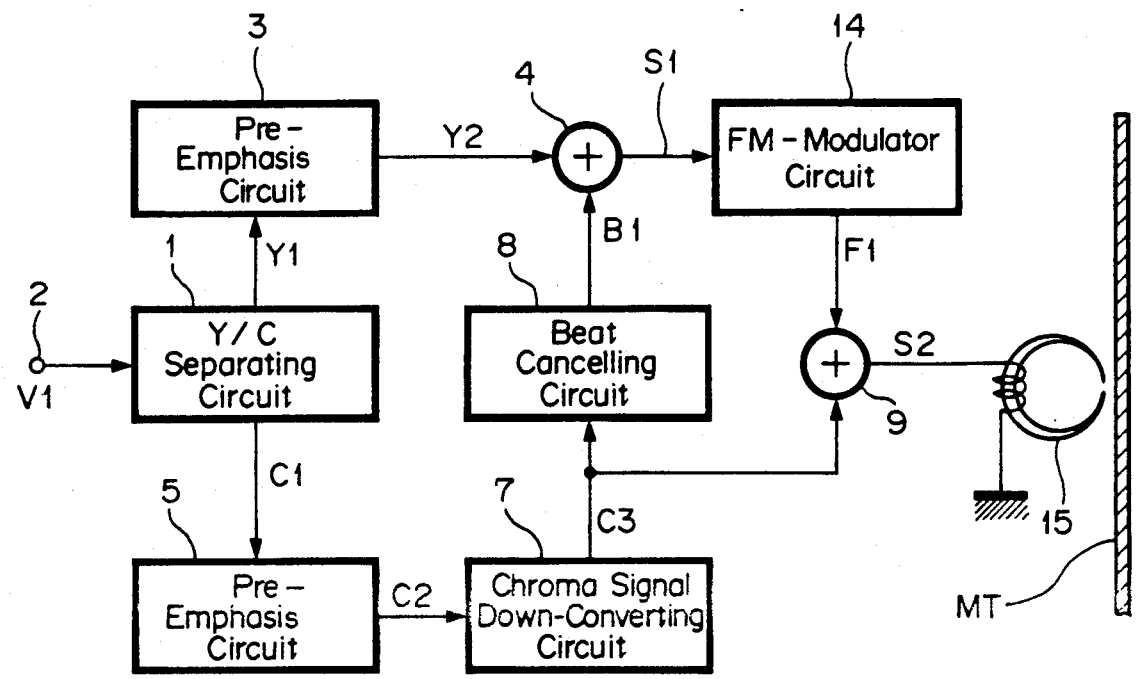
FIG. 1 is a block diagram illustrating a typical embodiment of a recording circuit of a mirror mother video tape recorder according to the present invention.

Referring now to FIG. 1, a luminance signal/chrominance signal separation circuit (hereinafter abbreviated as a Y/C separation circuit) 1 separates an information signal, that is, a color video signal V1 supplied from an input terminal 2 into a luminance signal Y1 and a chrominance signal C1.

The luminance signal Y1 is emphasized by a preemphasis circuit 3 to be converted into a luminance signal Y2 which is applied to one input terminal of an adder 4 acting as a mixing circuit. The chrominance signal C1 is emphasized by a preemphasis circuit 5 to be converted into a chrominance signal C2 and then applied to a chrominance signal down converting circuit 7. The chrominance signal down converting circuit 7 converts a carrier frequency fC (0.74 MHz in this embodiment, for example) of the chrominance signal C2 into a reduced carrier frequency to thereby generate a down-converted chrominance signal C3. The signal C3 is supplied to a beat cancelling circuit 8 and one input terminal of an adder 9 acting as a mixing circuit.

Figure 2:
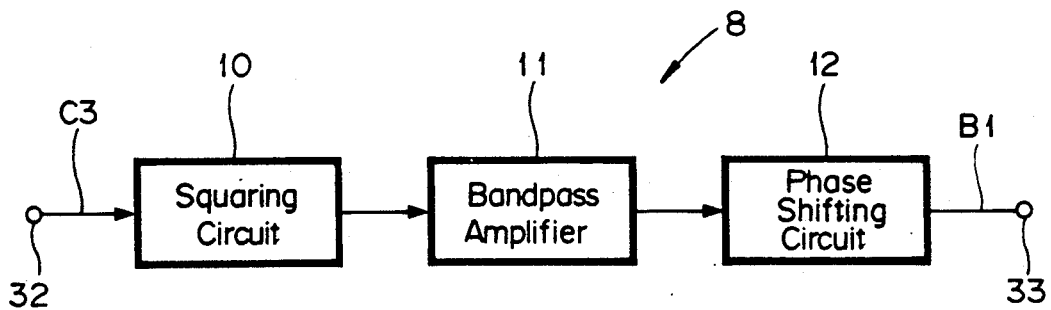
FIG. 2 is a block diagram illustrating a beat cancelling circuit of the recording circuit shown in FIG. 1.

The beat cancelling circuit 8 includes a squaring circuit 10, a band pass amplifier (BPA) 11 with a center frequency of 2fC and a phase shifter 12, as shown in FIG. 2. The beat cancelling circuit 8 generates a beat cancelling signal B1 having a frequency $2 \times fC$ (1.48 MHz, for example) in accordance with the down-converted chrominance signal C3 applied to an input terminal 32, and such beat cancelling signal B1 is applied to the other input of the adder 4 (see FIG. 1) from a terminal 33.

The adder 4 mixes the beat cancelling signal B1 and the luminance signal Y2 to generate an added signal S1 which is applied to a frequency modulation circuit 14. The frequency modulation circuit 14 subjects the added signal S1 to frequency modulation and supplies the frequency modulated added signal to the other input of the adder 9 as a frequency modulated signal F1. The adder 9 mixes the frequency modulated signal F1 and the frequency converted chrominance signal C3 to generate a composite or combined signal S2 which is then supplied to a magnetic head 15 as a current signal to be recorded. The magnetic head 15 generates a magnetic field in accordance with the composite signal S2 to magnetically record the combined signal S2 on a mirror mother tape MT.

A detailed circuit configuration of the beat cancelling circuit 8 will now be explained with reference to FIG. 3. The beat cancelling circuit 8 includes the input terminal 32, the output terminal 33, six transistors labelled from 15 to 20 and other related elements, wherein the, transistor 15, a transformer 21, diodes 23 and 24 and other related circuit elements form the squaring circuit 10. The transistors 16 and 17, a capacitor 25 and an inductor 26 connected in parallel, and other related elements form the BPA 11. Further, the transistors 18 to 20, a capacitor 27, a variable resistor 28, a switch 34 having one movable contact and two fixed contacts, a capacitor 29, a resistor 30, a variable resistor 31 and other related elements constitute the phase shifter 12. The squaring circuit 10, the BPA 11 and the phase shifter 12 are connected through AC coupling.

Operation of the above-described embodiment will now be explained. Explanation of the operations of the circuit elements other than the beat cancelling circuit 8 will be brief since they are well known.

Referring to FIG. 1, the color video signal V1 to be recorded on the mirror mother tape MT is separated into the luminance signal Y1 and the chrominance signal C1 by the Y/C separation circuit 1, then subjected to predetermined preemphasis processes by the preemphasis circuits 3 and 5 and thereafter applied to one input terminal of the adder 4 as the luminance signal Y2 and to the chrominance signal down converting circuit 7 as the chrominance signal C2, respectively.

Figure 3:
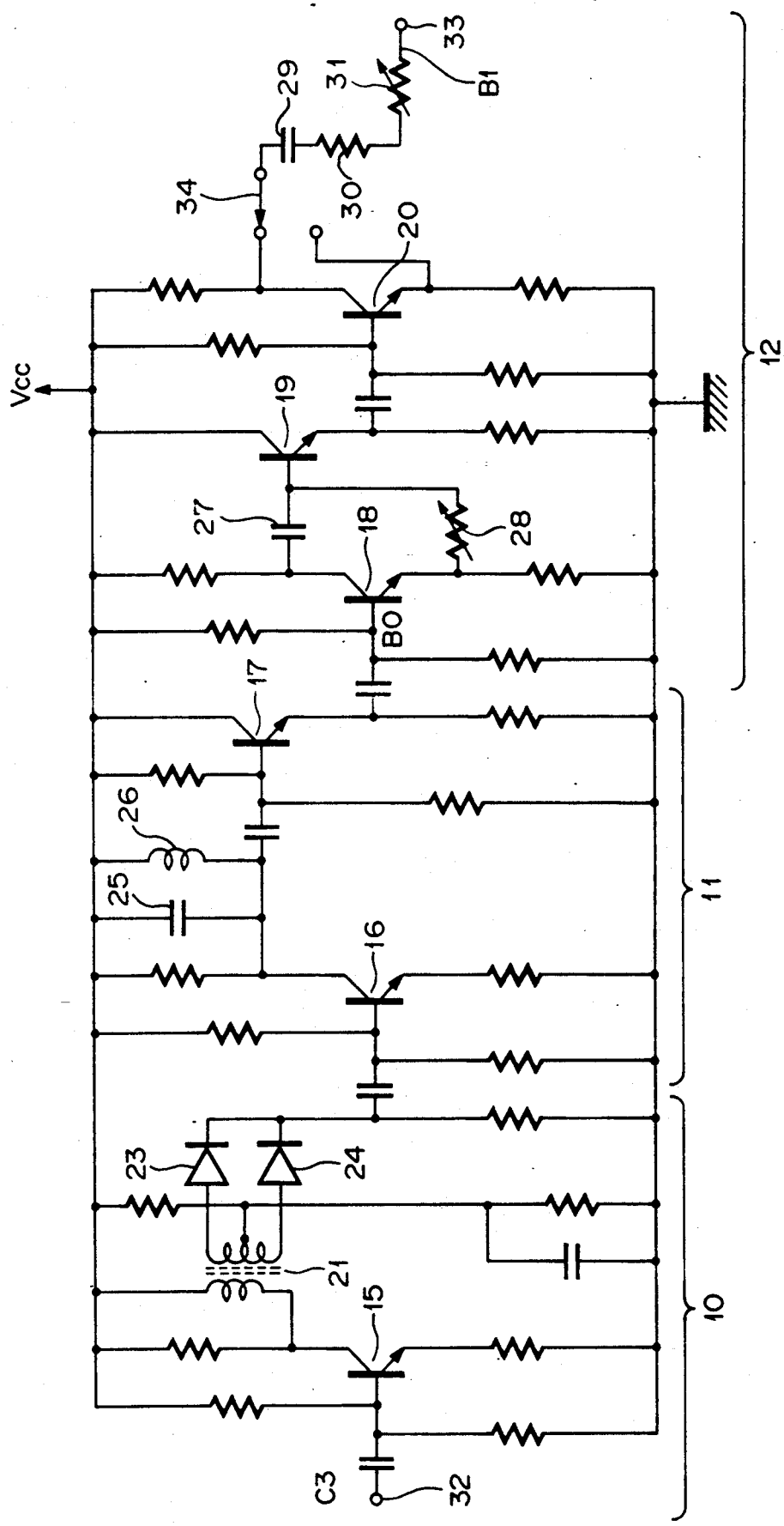
FIG. 3 is a detailed circuit diagram illustrating the beat cancelling circuit.

The chrominance signal C2 is converted into the down converted chrominance signal C3 with the reduced frequency fC by the chrominance signal down converting circuit 7 and then applied to the input terminal 32 of the beat cancelling circuit 8 (see FIG. 3).

In the squaring circuit 10 of the beat cancelling circuit 8, a signal of a frequency $fC \times fC$ and a signal of a frequency $2 \times fC$, are generated at cathode sides of the diodes 23 and 24 due to a single-phase full-wave rectifying function of the transformer 21 and the diodes 23 and 24. These signals generated at the cathode sides of the diodes 23 and 24 are applied to the BPA 11 wherein a beat cancelling original signal B0 of a frequency $2 \times fC$ is extracted from these signals by a parallel resonance circuit comprising the capacitor 25 and the inductor 26 and then applied to the phase shifter 12.

In the phase shifter 12, the gain of the beat cancelling original signal B0 is adjusted by the variable resistor 31 and also its phase is adjusted by the variable resistor 28 and further its polarity is selected by the switch 34 thereby producing a beat cancelling signal B1.

These adjusting and selecting processes in the phase shifter 12 occur after preparatory steps which will be explained in detail.

In a first preparatory step, the beat cancelling circuit 8 is eliminated from the circuit configuration of FIG. 1. Using the circuit configuration of FIG. 1 without the beat cancelling circuit 8, the following recording/playback (picture reproducing) operations (REC/PB operations) are performed: first, "the composite signal S2 from the adder 9 corresponding to the video signal V1 is supplied to the magnetic head 15 to record it on a mirror mother tape MT which is a metal tape of Co-Ni composition; next, the information signal thus recorded on the mirror mother tape MT is transferred and printed on the copy tape which is a metal tape having an upper layer of Ba-Fe and a lower layer of Co-γ by using the contact type magnetic printing apparatus (not shown); and finally, the transferred information signal on the copy tape is reproduced by the tape reproducing apparatus (not shown) to thereby produce reproduced information from which the level of a beat component of a frequency $2 \times fC$ is measured.

In a second preparatory step, the beat cancelling circuit 8 is inserted as shown in FIG. 1 and the variable resistor 31 acting as a gain adjuster is adjusted such that a level of the beat cancelling signal B1 at the output terminal 33 of the beat cancelling circuit 8 becomes equal to the level measured in the first preparatory step.

In a third preparatory step, the composite signal S2 including the beat cancelling signal B1 whose gain has been adjusted in the second preparatory step is again subjected to the above-described REC/PB operations to thereby produce reproduced information from which the level of the beat component of the frequency $2 \times fC$ is measured.

Figure 4A:
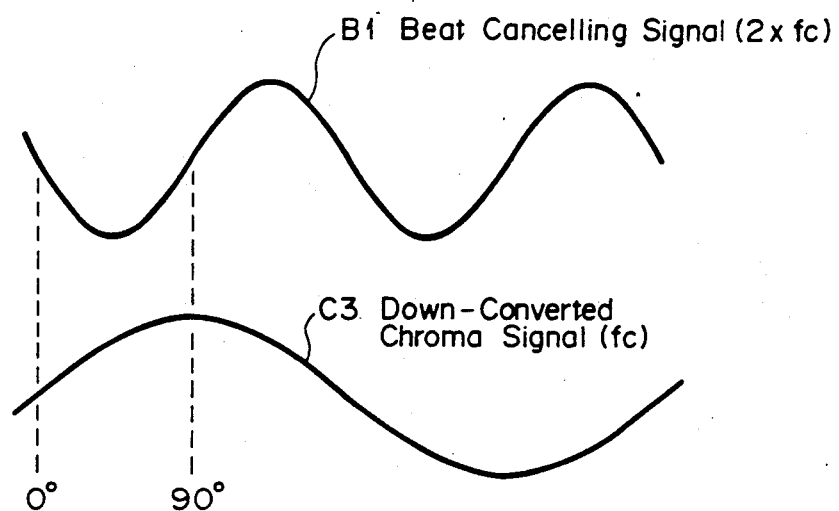
FIG. 4 is a pair of diagrams for explaining the operation of the recording circuit shown in FIG. 1.

In a fourth preparatory step, the effect of an amount of phase shift for the beat cancelling signal B1, used by the variable resistor 28 acting as a phase adjuster, is determined in the following manner: waveforms of the beat cancelling signal B1 of a frequency $2 \times fC$ and the down converted chrominance signal C3 are observed on an oscilloscope, for example, by using current probes, as shown in FIG. 4A so as to indicate the amount of phase shift by viewing a phase difference between these waveforms. In this case, it is possible to select a polarity of the signal B1 by switching the switch 34. Thereafter, the composite signal S2 including the beat cancelling signal B1 having its phase shift amount determined in this manner is again subjected to the above-described REC/PB operations for measurement of the level of the beat component of the frequency $2 \times fC$ in the reproduced information.

In a fifth preparatory step, the fourth preparatory step is repeated to adjust the variable resistor 28 until the level of the beat component of the frequency $2 \times fC$ in the reproduced information becomes a minimum value.

At this point, the preparatory steps for the adjusting processes of the phase shifter 12 are completed.

Figure 4B:
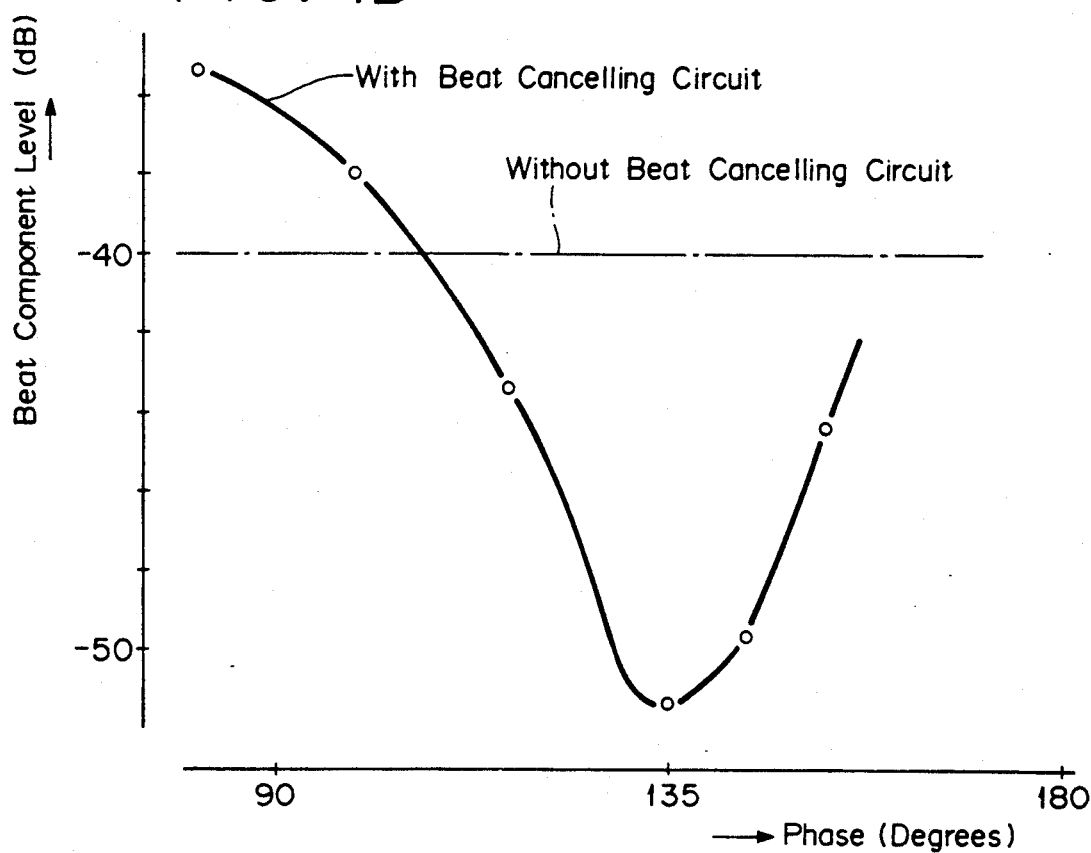

FIG. 4B is a diagram illustrating a comparison between a level of the beat component (noise component) in the reproduced signal of the copy tape appearing when using the recording circuit of the mirror mother VTR in this embodiment with the beat cancelling circuit 8 and a level of the beat component when using the recording circuit of the conventional mirror mother VTR without the beat cancelling circuit 8. As shown in FIG. 4B, the level of the beat component appearing when using the beat cancelling circuit 8 can be made less than $-50$ dB by suitably adjusting the amount of phase shift, so that it will be understood that a level of the beat component can be improved or made smaller by about $-10$ dB at a maximum in case of using the beat cancelling circuit 8 when compared with a case of not using the beat cancelling circuit 8 wherein the level of the beat component is about $-40$ dB as shown in FIG. 4B.

Thus, according to this embodiment, the beat cancelling signal B1 whose phase is opposite to that of the secondary beat component of a frequency $2 \times fC$ appearing during reproducing of the video signal recorded on the copy tape is generated, and the composite signal S2 including this beat cancelling signal B1 is recorded on the mirror mother tape MT. Therefore, when reproducing the video signal recorded on the copy tape which is magnetically transferred from the mirror mother tape MT, a distortion due to the secondary beat component of a frequency $2 \times fC$ of the down converted chrominance signal C3 can be almost eliminated from the reproduced video signal.

Thus, it becomes possible to increase a recording current of the down converted chrominance signal C3 to be recorded on the mirror mother tape MT, if necessary, so that when reproducing the video signal magnetically transferred from the mirror mother tape MT to the copy tape, a signal to noise ratio of the chrominance signal of the reproduced video signal can be improved.

Also, when the video signal thus prepared on the copy tape is reproduced and then an image of the reproduced video signal is displayed on a monitor, for example, the abovedescribed noise component having a mesh-like configuration due to the secondary beat component of a frequency $2 \times fC$ of the down converted chrominance signal C3 becomes unobtrusive or relatively reduced thereby improving the quality of an image on the monitor.

According to the present invention, therefore, since both the down converted chrominance signal and the frequency modulated signal obtained by subjecting the added signal, of the beat cancelling signal and the luminance signal, consisting to frequency modulation are recorded on a mirror mother tape, when the video signal copied on a copy tape which is magnetically transferred from the mirror mother tape is reproduced, the secondary beat component of a frequency $2 \times fC$ of the down converted chrominance signal can be almost eliminated, so that it has become possible to prepare a mirror mother tape which is substantially without distortion due to the secondary beat component of a frequency $2 \times fC$.

Further, it has become possible to increase a recording current for the down converted chrominance signal to be recorded on the mirror mother tape, so that, when the video signal magnetically transferred from a mirror mother tape to a copy tape is reproduced, a signal to noise ratio of the chrominance signal of the video signal reproduced from the copy tape can be improved. Having described a preferred embodiment of the invention with reference to the accompanying drawings, it is to be understood that the invention is not limited to this precise embodiment and that various changes and modifications could be effected by one skilled in the art without departing from the spirit or scope of the invention as defined in the appended claims.

We claim as our invention:

1. An apparatus for recording, on a mirror mother tape to be used in contact printing process, an incoming color video signal including a chrominance signal and a luminance signal, said apparatus comprising:

means for down converting said chrominance signal into a down converted chrominance signal having a reduced carrier frequency fC;

means for generating, from said down converted chrominance signal, a beat cancelling signal having a frequency 2 fC;

means for adding said beat cancelling signal to said luminance signal so as to generate an added signal;

means for combining said down converted chrominance signal with said added signal so as to provide a combined signal; and means for recording said combined signal on the mirror mother tape.

2. An apparatus for recording on a mirror mother tape as in claim 1, wherein said added signal is supplied to frequency modulating means for frequency modulating said added signal as supplied to said combining means.

3. An apparatus for recording on a mirror mother tape as in claim 1, wherein said means for generating a beat cancelling signal includes signal squaring means for generating squared signals from said down converted chrominance signal, filtering means for extracting from said squared signals a beat cancelling original signal of a frequency $2 \times fC$, and phase and level adjusting means for adjusting a phase and gain, respectively, of said beat cancelling original signal so as to produce said beat cancelling signal.

4. An apparatus for recording on a mirror mother tape as in claim 1, wherein said means for generating a beat cancelling signal includes means for squaring the frequency of said down converted chrominance signal to produce a signal of a frequency $fC \times fC$ and a signal of a frequency $2 \times fC$, means for extracting said signal of a frequency $2 \times fC$ from the signals produced by said squaring means, and means for adjusting a phase and a gain of the extracted signal of a frequency $2 \times fC$ to generate said beat cancelling signal.

* * * * *